(12) United States Patent
Wood et al.

(10) Patent No.: US 7,818,145 B2
(45) Date of Patent: Oct. 19, 2010

(54) DETECTING AN ERROR IN A PREDICTION OF RESOURCE USAGE OF AN APPLICATION IN A VIRTUAL ENVIRONMENT

(75) Inventors: Timothy W. Wood, Amherst, MA (US); Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 173 days.

(21) Appl. No.: 12/241,972

(22) Filed: Sep. 30, 2008

(65) Prior Publication Data

US 2010/0082290 A1 Apr. 1, 2010

(51) Int. Cl.
*G06F 19/00* (2006.01)
(52) U.S. Cl. .................... 702/179; 714/100
(58) Field of Classification Search ............... 702/179, 702/182–185; 705/412; 714/100
See application file for complete search history.

(56) References Cited

U.S. PATENT DOCUMENTS

2008/0319933 A1* 12/2008 Moussa et al. ............. 706/31

OTHER PUBLICATIONS

Mosberger, D. et al., "httperf-A Tool for Measuring Web Server Performance", Proc. of Workshop on Internet Server Performance, 1998.
Apache JMeter, http://jakarta.apache.org/jmeter/, downloaded Sep. 29, 2008.
Sysstat-7.0.4. http://perso.orange.fr/sebastien.godard/, downloaded Sep. 29, 2008.
Agostinelli, C., "Robust Stepwise Regression", vol. 29, Issue 6, Aug. 2002, Abstract only.
Jorgensen, M., "Iteratively Reweighted Least Squares", Encyclopedia of Environments, Wiley InterScience, 2002, Abstract only.
Pires, R.C., et al., "Iteratively Reweighted Least-Squares State Estimation ThroughGivens Rotations", IEEE Transactions on Power Systems, Nov. 1999, Abstract only.

* cited by examiner

*Primary Examiner*—Edward Raymond

(57) ABSTRACT

Described herein is a method for detecting an error in a prediction of resource usage of an application running in a virtual environment, comprising: providing a plurality of benchmark sets, executing the plurality of benchmark sets in a native hardware system in which the application natively resides, executing the plurality of benchmark sets in the virtual environment, collecting first traces of first resource utilization metrics in the native hardware system based on the execution of each of the plurality of benchmark sets in the native hardware system, collecting second traces of second resource utilization metrics in the virtual environment based on the execution of each of the plurality of benchmark sets in the virtual environment, generating at least one initial prediction model that maps the first traces of first resource utilization metrics to the second traces of second resource utilization metrics, computing a plurality of mean squared errors (MSE's) based on the at least one initial prediction model, each of the MSE's is further based on and associated with the collected first and second traces for a different one of the plurality of benchmark sets, and determining whether to use the initial prediction model to predict a resource usage of the application running in the virtual environment based on the plurality of MSEs.

15 Claims, 9 Drawing Sheets

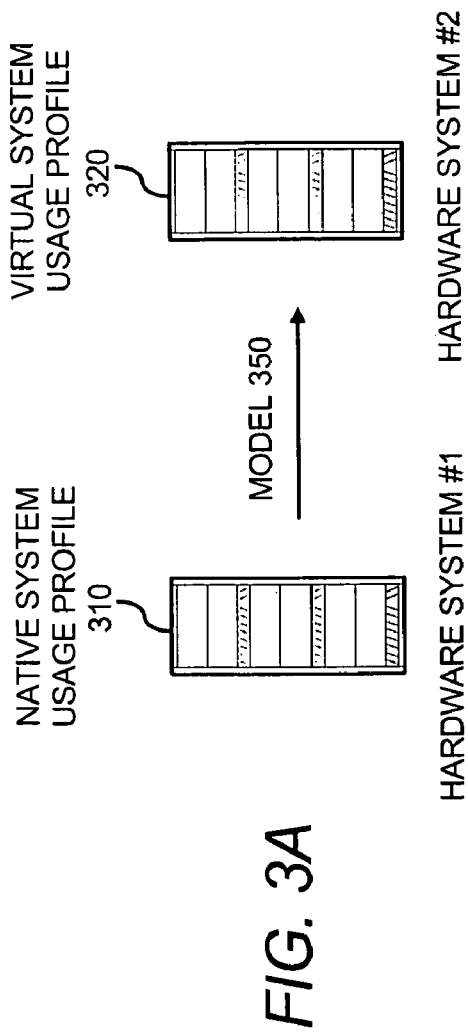
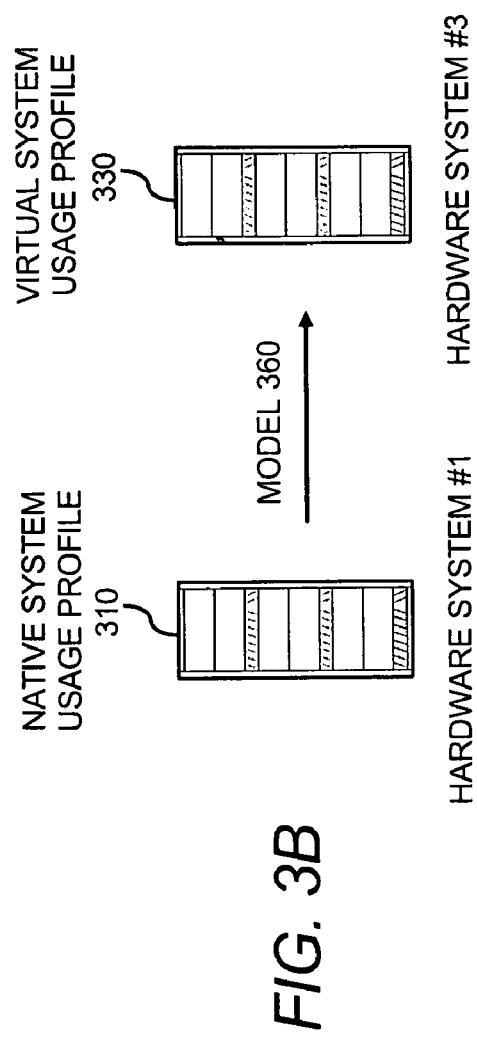
FIG. 3A
FIG. 3B

DETECTING AN ERROR IN A PREDICTION OF RESOURCE USAGE OF AN APPLICATION IN A VIRTUAL ENVIRONMENT

CROSS-REFERENCE

This application is related to the following applications:

a) U.S. patent application Ser. No. 12/241,874, entitled, "PREDICTING RESOURCE USAGE OF AN APPLICATION IN A VIRTUAL ENVIRONMENT," as filed on Sep. 30, 2008;

b) U.S. patent application Ser. No. 11/241,948, entitled, "SCALING A PREDICTION MODEL OF RESOURCE USAGE OF AN APPLICATION IN A VIRTUAL ENVIRONMENT," as filed on Oct. 4, 2005;

c) U.S. patent application Ser. No. 12/241,998, entitled, "OPTIMIZING A PREDICTION OF RESOURCE USAGE OF AN APPLICATION IN A VIRTUAL ENVIRONMENT," as filed on Sep. 30, 2009;

d) U.S. patent application Ser. No. 12/241,913, entitled, "IMPROVING ACCURACY IN A PREDICTION OF RESOURCE USAGE OF AN APPLICATION IN A VIRTUAL ENVIRONMENT," as filed on Sep. 30, 2008;

e) U.S. patent application Ser. No. 12/242,034, entitled, "OPTIMIZING A PREDICTION OF RESOURCE USAGE OF MULTIPLE APPLICATIONS IN A VIRTUAL ENVIRONMENT," as filed on Sep. 30, 2008.

These applications are herein incorporated by reference in their entireties.

BACKGROUND

Virtualization and automation are key capabilities desired of Next Generation Data Centers (NGDC) for enterprises. As referred herein, a data center typically includes a location, such as a room that houses computer systems and associated components to store and manage data critical to the mission(s) of an enterprise. The primary motivation for enterprises to adopt virtualization technologies is the promise of creating a more agile and dynamic information technology (IT) infrastructure. To achieve this goal, virtualization technologies have been used to implement server consolidation so as to reduce the total number of servers in response to the problem of server sprawl in a data center. Server sprawl occurs when multiple, under-utilized servers take up more space and consume more resources than can be justified by their workloads.

One example of virtualization technologies being adopted for server consolidation is the Virtual Machine Monitor (VMM), also known as a Virtual Machine (VM) host or a hypervisor. The VMM is a software component or layer that is implemented in a physical or hardware machine, system, or platform to host VM guests therein, which are isolated virtual environments on the shared hardware platform. Accordingly, VMMs enable diverse applications to run in isolated environments on a shared hardware platform, and in such a way so as to provide some degree of fault and performance isolation between the consolidated applications.

As virtual machines and systems enter the mainstream and are deployed in larger numbers for implementation of NGDCs, manageability, automation, accurate resource accounting and quality-of-service-aware (QoS-aware) resource allocation have become the real differentiators to help enterprises create dynamic IT infrastructures for their NGDCs.

BRIEF DESCRIPTION OF THE DRAWINGS

Embodiments are illustrated by way of example and not limited in the following figure(s), in which like numerals indicate like elements, in which:

FIGS. 3A-B illustrate examples of the use of hardware platforms to implement native hardware system for an application and a virtual environment in which the application may be virtualized for execution, in accordance with one embodiment.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures are not described in detail so as not to unnecessarily obscure the description of the embodiments.

A typical approach for evaluating which workloads can be efficiently consolidated together is based on multi-dimensional "bin packing" of resource usage traces. Typically, under such an approach, each application is characterized by its CPU, I/O and memory usage over time. Then a bin packing algorithm finds a combination of workloads with resource requirements which do not exceed the available server resources (some algorithms may allow a certain degree of resource overbooking as well as some additional constraints on workload placement). After the initial workload placement is done, additional workload management tools may be used to dynamically allocate system resources to match underlying application demands and to support the required application performance.

As described herein, various embodiments are concerned with the initial workload placement phase that receives as an input the application resource usage traces of its native hardware system or platform. It is important to know what an application's resource needs are going to be prior to transitioning it to a virtual environment with one or more virtual machines (VMs) therein. Resource requirements (in particular, CPU requirements) can increase due to virtualization overheads. If these overheads are not accounted for during initial planning, an application could be deployed to a server with insufficient resources, resulting in unacceptable application performance.

Figure 1B:
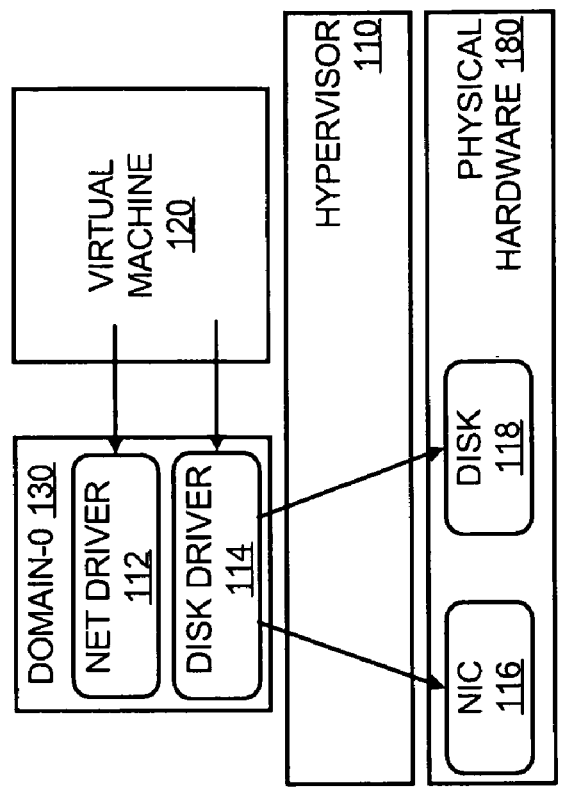
FIGS. 1A-B illustrate popular Input/Output (I/O) models of Xen® Virtual Machines.
Figure 1A:
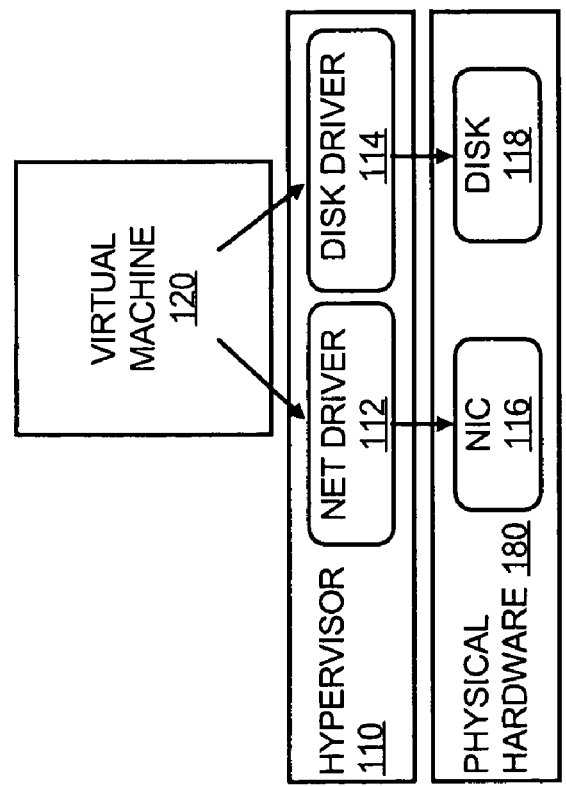

As illustrated in FIGS. 1A-B, there are two popular I/O models for VMs. These two VM models are demonstrated, for example, in the evolution of the I/O architecture of Xen®, which is an open-source VMM or hypervisor that serves as an abstraction layer between the physical hardware 180 and one or more VM guests 120 (hereinafter, "VM 120"). In its original design, as illustrated in FIG. 1A, the Xen hypervisor 110 itself contained device driver code, as illustrated by the network driver 112 and disk driver 114, and provided safe, shared access for I/O hardware, as illustrated by the Network Interface Card or Controller (NIC) 116 and the disk drive 118, for the VM guest 120. In its current design, as illustrated in FIG. 1B, the Xen hypervisor 110 no longer hosts device driver code. Instead, unmodified device drivers, such as the network driver 112 and disk driver 114, are allowed to be hosted and executed in one or more isolated "driver domains," as illustrated by a management Domain-0 130 (hereinafter, "dom-0 130"). Typically, the dom-0 130 hosts unmodified device drivers, such as Linux® device drivers, and plays the role of the driver domain. Thus, the current I/O model in FIG. 1B results in a more complex CPU usage model. That is, for I/O intensive applications, CPU usage has two components: CPU consumed by the VM guest 120 and CPU consumed by the dom-0 130 which hosts the device drivers 112, 114 and performs I/O processing on behalf of the guest domain 120. Note that a trace is an ordered series, such as a time series, of monitored or collected data on performance metrics (for example, resource usage metrics of an application) of a system such as a server. Application resource usage traces are routinely collected over some time period (e.g., 3-6 months) to get a representative application resource usage profile. Then these traces can be used for capacity planning and workload placement or for other uses.

Figure 2:
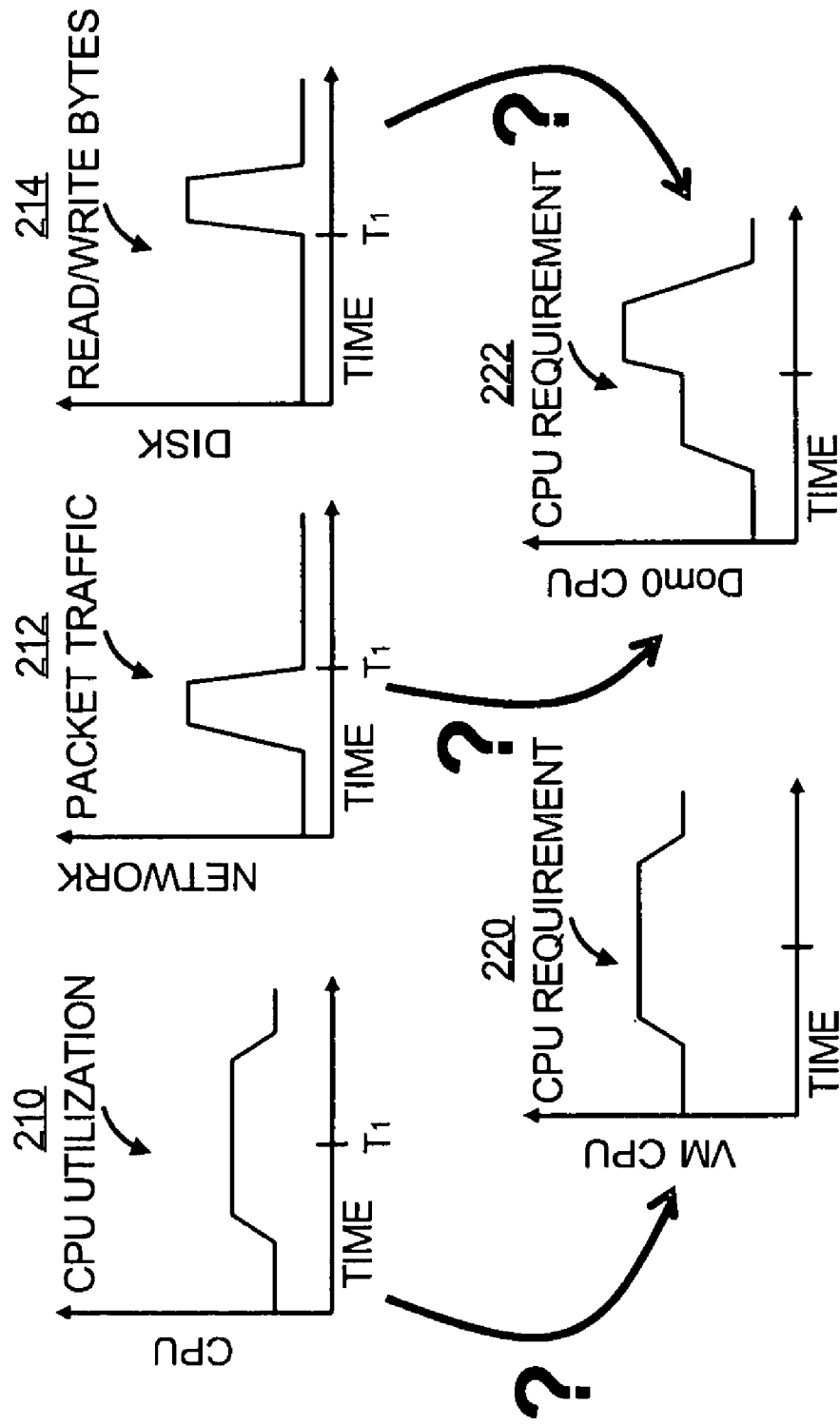
FIG. 2 illustrates the goal of using native application traces to predict virtualized application traces, in accordance with one embodiment.

Accordingly, various embodiments as described herein provide a methodical approach for predicting the CPU requirements of applications (or workloads) when they are transferred to a virtual environment. That is, given resource utilization traces of an application running natively on its hardware system or platform, the various embodiments aim to predict what the application's resource requirements would be if it were transitioned to a virtual environment on a given hardware platform. For example, a collection of application resource usage traces (over time) in a native hardware system or platform is monitored and provided as shown in FIG. 2 at the top to show CPU utilization 210, transferred and received networking packets 212, and read and write bytes (disk) 214. The goal is to use these native application resource usage traces to predict virtualized application traces, or resource needs in a virtual environment to run the same application. Namely, as shown in FIG. 2 at the bottom, the predicted resource needs are the CPU requirement 220 of the VM guest domain 120 where the application is going to reside and execute and the CPU requirement 222 of the dom-0 130 which performs I/O processing on behalf of the VM guest domain 120 to facilitate the execution of the application within the later.

As described herein, it is expected that the CPU utilization of the VM guest 120 is highly correlated and proportional to the native CPU usage profile of the application, while the CPU utilization of the dom-0 130 is mostly determined by a combination of I/O profiles (both network and disk). As also described herein, there is a focus on predicting CPU utilization in the virtualization system because other performance metrics, such as disk and network request rates, are not directly impacted by the virtualization layer. As used herein, "disk" or "disk memory" refers to the main storage mechanism used to store data as opposed to cache memory such as Random Access Memory (RAM) chips in a hardware system. Disk memory may include, for example, a hard disk drive and/or a removable storage drive representing a floppy diskette drive, a magnetic tape drive, a compact disk drive, etc., or a nonvolatile memory where a copy of the software is stored. Disk memory may also include, for example, ROM (read only memory), EPROM (erasable, programmable ROM), EEPROM (electrically erasable, programmable ROM), or any other electronic, optical, magnetic, or other storage or transmission device capable of electronic data storage.

In one embodiment, the prediction of CPU requirements of virtualized applications (that is, applications running in a virtual environment or system) includes the following components: a) a benchmark suite having a predetermined set of benchmarks to profile the different types of virtualization overhead on a given hardware platform, whereby the benchmark suite is executed on the native hardware and in a virtual environment to create a "native" resource usage profiles and a "virtual" resource usage profiles; and b) regression-based computation to create a model that maps the "native" hardware system usage profile into the "virtual" one, whereby this model helps to predict the resource requirements of any application to be virtualized on a given hardware platform.

Accordingly, the benchmark suite is first used to accumulate samples of resource usage profiles by executing the benchmark suite in both native and virtual environments so as to collect benchmark data for different benchmark sets to determine a general relationship between the application resource usage in native and virtual systems. Then a model may be created for the virtual environment or system, which is hosted or implemented on the same or different hardware system as the native hardware system, to predict resource requirements for the virtualized application. For example, FIG. 3A illustrates the use of a native system resource usage profile 310 and a virtual system resource usage profile 320 running on separate hardware systems or platforms #1 and #2 to generate or create a first model 350 for predicting resource requirements of a virtualized application. However, the hardware systems #1 and #2 have substantially identical system configurations, such as both hardware systems #1 and #2 are AMD® Opteron™ systems. Thus, the hardware systems #1 and #2 may be one and the same. In another example, FIG. 3B illustrates the use of a native system resource usage profile 310 running on separate hardware systems (or platforms) #1 and #3 to generate or create a second different model 360 for predicting resource requirements of a virtualized application. However, the hardware systems #1 and #3 have different system configurations, such as the hardware system #1 may be an AMD® Opteron™ system and the hardware system #3 may be an Intel® Xeon™ system. The benchmark suite and prediction modeling are further detailed below.

At a high level, the benchmark suite includes three types or patterns of workload that cause a test system (hardware or virtual) to perform CPU-intensive computation, send and receive network packets, and read and write to disk. A client system may be used to provide inputs to the test system so as to adjust the rate and type of requests to control the amount (intensity) of CPU computation and I/O activities performed on the test system. The same client system also may be used to generate the prediction model for resource usage of a virtualized application.

As referred herein, a CPU-intensive workload predominantly takes up the computational resources, such as CPU resources, of a test system during its execution in the test system while remaining minimally taxing to other resources, such as networking and memory I/O resources, of the test system. For example, the CPU-intensive computation workload calculates the Fibonacci series when it receives a request from, for example, a client system. The number of terms in such a series may be varied to adjust the load and computation time on the test system. It should be understood that other mathematical algorithms or known computational intensive algorithms may be used in lieu of the Fibonacci series for the CPU-intensive computation workload.

Similarly, as referred herein, a network-intensive workload predominantly takes up the networking resources of the test system during its execution in the test system while remaining minimally taxing to other resources of the test system. In one embodiment, the network-intensive workload has two modes depending on the type of client request. In transmit mode, each incoming client request results in a large file being sent from the system being tested to the client system. In receive mode, one or more clients upload files to the benchmark application. The size of transferred files and the rate of client requests may be varied to adjust the network utilization rate.

Likewise, as referred herein, a disk- or memory-intensive workload predominantly takes up the memory I/O resources of the test system during its execution in the test system while remaining minimally taxing to other resources of the test system. In one embodiment, the disk-intensive workload has read and write modes. In these two modes, a random file is either, respectively, read from or written to a multi-level directory structure. File size and request rate may be adjusted to control the disk I/O rate.

Accordingly, each workload is created by adjusting the request type sent to the test system from a client system or machine. In one embodiment, each type of CPU-, network-, and disk-intensive workload patterns is further divided into several (for example, five) different intensities ranging from 10% load to 90% maximum load on the test system. The maximum load that a test system can handle is determined by increasing the throughput of benchmark requests from the client until either the CPU of the VM 120 or dom-0 130 becomes saturated during testing. The range of intensities are then measured for each workload type in order to build an accurate prediction model for the full working range of the virtual server. In one embodiment, the benchmark suite may be implemented as a set of Hypertext Preprocessor (PHP) scripts running on a web server at the bench-marked server side. Thus, the benchmark suite may be easily deployed and executed as software applications on a wide range of hardware systems or platforms within a software environment that is already familiar with data center administrators. Consequently, the developed benchmark suite is operable to generate a diverse set of simple and more complex workloads that exercise different components of a test system.

While the benchmark suite is running or executing on each test system, namely, the native hardware system and the virtual system, resource utilization traces of each system are gathered or collected, for example, by an automated benchmark system, to define the platform profiles used as the training set or data for the prediction model. In one embodiment, within the native hardware system, resource utilization traces of eleven different resource metrics or measurements related to CPU utilization, network activity, and disk I/O are gathered or collected. A list of these resource metrics is shown in Table 1. Within the virtual system based on the current I/O model illustrated in FIG. 1B, resource utilization traces of two CPU utilization metrics for the VM 120 and dom-0 130 are also collected or gathered. Alternatively, if the original I/O model of VM as illustrated in FIG. 1A is employed, resource utilization traces of two CPU utilization metrics for the VM 120 and hypervisor 110 are collected or gathered. These resource utilization traces are to be gathered or collected with low overhead. Furthermore, because these traces are to be gathered from a live application being transitioned to a virtual environment, a lightweight monitoring system may be used to gather data. For example, they may be gathered in Linux™ with the Sysstat monitoring package.

TABLE 1

| CPU Utilization | Network Utilization | Disk Utilization |
| --- | --- | --- |
| User Space % | Rx packets/sec | Read requests/sec |
| Kernel % | Tx packets/sec | Write requests/sec |
| I/O Wait % | Rx bytes/sec | Read blocks/sec |
|  | Tx bytes/sec | Write blocks/sec |

The time and workload type of each resource utilization trace are stored to simplify data processing and allow for the possibility of targeted benchmark reruns. As shown in Table 1, three CPU-related metrics are monitored, namely, the user space % CPU utilization, the kernel space % CPU utilization, and the I/O wait % CPU utilization, because different types of activities may have different virtualization overheads. For example, user space processing such as simple arithmetic operations performed by an application are unlikely to have much overhead in current virtualization platforms. In contrast, tasks which occur in the kernel space, such as context switches, memory management, and I/O processing, are likely to have a higher level of overhead because they may use traps to the hypervisor. User space % CPU utilization refers to the percentage (%) of CPU resources used to run the user space (defined by an operating system that manages the native hardware system) and any application executing therein, kernel space % CPU utilization refers to the percentage of CPU resources used to run the kernel space (also defined by the operating system that manages the native hardware system), and I/O wait % CPU utilization refers to the percentage of CPU resources that are tied up while an application is waiting for I/O operations such as read and write.

For network utilization, both the packet rates and byte rates of the network interfaces are measured or monitored because different virtual environments may handle I/O virtualization in different ways. For example, prior to Xen version 3.0.3, incoming network packets were passed between the dom-0 130 and the VM guest domain 120 by flipping ownership of memory pages. Thus, the CPU overhead associated with receiving each packet was independent of the packet's size. Newer versions of Xen directly copy packets from the dom-0 130 to the VM guest domain 120 rather than using page flipping. Thus, the overhead is also related to the number of bytes received per second, not just the number of packets. The paths for sending and receiving are differentiated because they may have different optimizations. For disk (or memory) utilization, disk measurements are divided into four categories based on similar reasoning as also shown in Table 1.

Table 2 shows a sample of platform profile of collected resource usage traces of the executed benchmark suite. The first column indicates the time intervals at which the traces are collected. The second column provides an identification of the particular benchmark set in the benchmark suite, which is executed to generate the associated resource utilization traces that form the benchmark data for the particular benchmark set, so that the same benchmark set may be used for a rerun as desired in the future. For example, a benchmark suite may include multiple benchmark sets, with each set created from one or more workload types and different workload parameters therein, such as different I/O rates, load intensities, etc. The next eleven columns indicate benchmark data collected on the native hardware system for each of the eleven selected resource utilization metrics noted above. The last two columns indicate data collected for CPU utilizations of the VM guest domain 120 and the dom-0 130 in the virtual environment, as also noted above for the current I/O model of VM illustrated in FIG. 1B. Again, alternatively, if the original I/O model of VM as illustrated in FIG. 1A is employed by the native system, the last two columns are used to indicate data collected for CPU utilizations of the VM guest domain 120 and hypervisor 110 as percentages of total CPU resources available in the virtual system.

TABLE 2

| Time Int. | Benchmark ID | User CPU % | ... | Rx Pkts/s | ... | Rd Blks/s | Write Blks/s | CPU VM % | CPU D-0 % |
|---|---|---|---|---|---|---|---|---|---|
| 1 | 1 | 22 | ... | 500 | ... | 80 | 120 | 24 | 8 |
| 2 | 1 | ... | ... | ... | ... | ... | ... | ... | ... |
| ... | ... | ... | ... | ... | ... | ... | ... | ... | ... |

Using a regression-based approach, a prediction model is generated or created to map the native hardware system usage profile into a virtual one. This model helps to predict the resource requirements of any application to be virtualized on a given hardware platform. Thus, to find the relationship between the application resource usage in native and virtual systems, the collected resource usage platform profile, such as the one shown in Table 2, is used to form a set of equations that calculate CPU utilization of the dom-0 130 as a linear combination of the different metrics:

$$U_{dom0}^1 = c_0 + c_1 * M_1^1 + c_2 * M_2^1 + \ldots + c_{11} * M_{11}^1$$

$$U_{dom0}^2 = c_0 + c_1 * M_1^2 + c_2 * M_2^2 + \ldots + c_{11} * M_{11}^2 \quad (1)$$

where $M_j^i$ is a value of metric $M_i$ collected during the time interval j for a benchmark set executed in the native environment, and $U_{dom0}^j$ is a measured CPU utilization for a benchmark set executed in the virtual environment (for example, domain-0 130) with the corresponding time interval j.

With $c_0^{dom0}, c_1^{dom0}, \ldots, c_{11}^{dom0}$ denoting the approximated solution for the equation set (1), an approximated utilization $\hat{U}_{dom0}^j$ is calculated as:

$$\hat{U}_{dom0}^j = c_0^{dom0} + \sum_{i=1}^{11} M_i^j \cdot c_i^{dom0} \quad (2)$$

To solve for $c_i^{dom0}$ ($0 \leq i \leq 11$), any regression method may be used. For example, the least squares regression method may be used to solve the set of equations (1) and (2) so as to calculate the $c_0^{dom0}, c_1^{dom0}, \ldots, c_{11}^{dom0}$ coefficients while minimizing the error:

$$e = \sqrt{\sum_j (\hat{U}_{dom0}^j - U_{dom0}^j)_j^2} \quad (3)$$

The set of coefficients $c_0^{dom0}, c_1^{dom0}, \ldots, c_{11}^{dom0}$ is a first prediction model that describes the relationship between the application resource usage in the native system and application CPU usage in the dom-0 130. Another set of equations similar to the set of equations (1) are also formed to characterize the CPU utilization of the VM guest domain 120 by replacing $U_{dom0}^i$ with $U_{vm}^i$. The resulting solution $c_0^{vm}, c_1^{vm}, \ldots, c_n^{vm}$ then defines a second prediction model that relates the application resource usage in the native system and application CPU usage in the VM 120 running the application. Thus, with known values of $M_j^i$ for metrics $M_i$ at time intervals j for an application running in the native system and known sets of coefficients $c_0^{dom0}, c_1^{dom0}, \ldots, c_{11}^{dom0}$ and $c_0^{vm}, c_1^{vm}, \ldots, c_n^{vm}$, the sets of equations (2) for both $U_{dom0}^i$ and $U_{vm}^i$ may be used to effectively predict the resource usage of the same application when virtualized in a particular virtual system.

Figure 4:
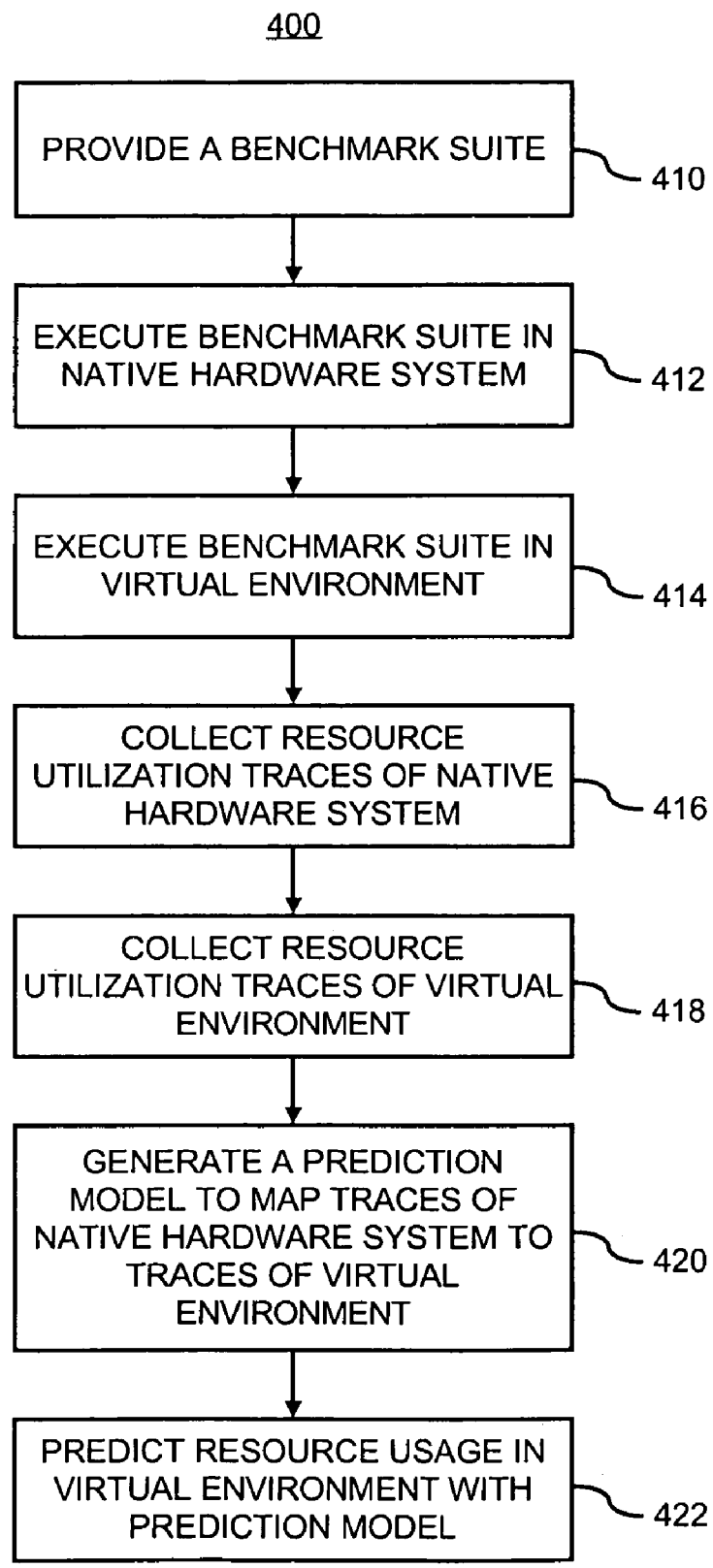
FIG. 4 illustrates a process for predicting resource usage of an application running in a virtual environment platform as it is transferred from its native hardware system, in accordance with one embodiment.

Accordingly, FIG. 4 illustrates a method 400 for predicting resource usage, particularly, CPU requirements, of an application running in a virtual environment or system as it is transferred from its native hardware system, in accordance with one embodiment. For illustrative purposes only and not to be limiting thereof, FIG. 4 is discussed with reference to the VM model illustrated in FIG. 1B and systems illustrated in FIGS. 3A-B.

At 410, a benchmark suite is prepared or provided to include a plurality of benchmark sets of CPU-intensive computation, network-intensive, and disk-intensive workloads as described earlier.

At 412, the benchmark suite is executed in a native hardware system so as to gather resource utilization traces of such a system as it executes the benchmark suite. The native hardware system is, for example, the hardware system #1 in FIGS. 3A-B that is initially used to natively run a desired application which is now desired to be run in a desired virtual environment or system within the same hardware system #1 (FIG. 3A) or in a different hardware system #2 (FIG. 3B).

At 414, the resource utilization traces of the native hardware system (that is, the traces of the eleven resource utilization metrics in the native hardware system) are collected to form a native hardware system profile while the benchmark suite is running therein.

At 416, the benchmark suite is also executed in the desired or selected virtual environment that is to replace the native hardware system for running the desired application.

At 418, the resource utilization traces of the virtual system (that is, the traces of the two CPU utilization metrics in the virtual system) are also collected to form a virtual system profile while the benchmark suite is running in the virtual system.

At 420, as described earlier, one or more prediction models are generated using a regression-based approach to map the native hardware system profile to the virtual system profile.

At 422, the prediction model(s) may be used to predict a resource usage of an application running in the virtual system once it migrates over from the hardware system in which it natively resides and runs. That is, once a prediction model is generated or created, it may be applied to resource utilization traces of other applications in order to predict what their CPU requirements are going to be once they are transferred to a virtual environment.

The method 400 as illustrated in FIG. 4 is also applicable for generating prediction models for the hypervisor 110 and VM 1200 for a virtual environment that follows the VM model illustrated in FIG. 1A.

Figure 5B:
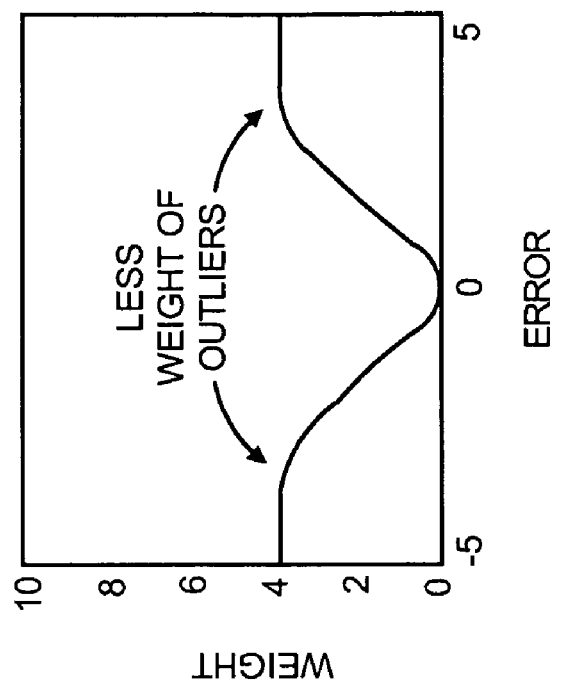
FIGS. 5A-B illustrate a comparison of errors for regression weighting functions, in accordance with one embodiment.
Figure 5A:
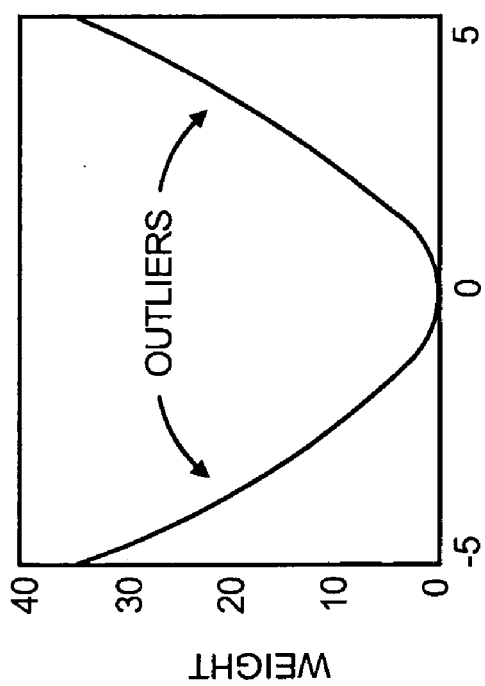

As described above, both the native hardware and virtual systems run an identical benchmark suite. The resource utilization traces from both systems are then gathered, for example, by an automated benchmark system, to define the platform profiles that are used as training data for the prediction model. There are instances where errors, such as benchmark timing errors, and noises, such as those generated by anomalous background processes can skew the measurements, leading to incorrect data points in the platform profiles. There is a possibility that a few incorrect data points, or bad outliers, may significantly impact the model accuracy as achieved by the aforementioned regular least squares regression method, which is based on minimizing the overall absolute error across multiple equations in a set of data points. That is, the regular least squares regression method generates a prediction model by creating an initial linear regression fit for a set of data points and then refining that fit based on the error between each data point and the initial linear regression line. Data points pull the line towards them based on their weight, which is equal to the square of the distance from each data point to the line. Thus, the weight of a data point increases quadratically with its error as shown in FIG. 5A. This can lead to a few bad data points, such as bad outliers, having more sway or effect over the linear regression line than they should.

Accordingly, in one embodiment, to lessen the impact of occasional bad measurements, a more robust linear regression method, such as the iteratively reweighted least squares regression method, is employed in lieu of the aforementioned regular least squares regression method. This robust linear regression method uses a weighted least squares algorithm, such as a bisquare weighting function which is initially quadratic, but then levels off to lessen the weight of outliers, or data points with high error, as illustrated in FIG. 5B.

A direct or naïve linear regression approach, such as the least squares regression method described above, operates to set non-zero values to all the model coefficients ($c_0^{dom0}$, $c_1^{dom0}$, ..., $c_{11}^{dom0}$ and $c_0^{vm}$, $c_1^{vm}$, ..., $c_n^{vm}$) in order to produce the minimal error, e, when the prediction model is applied to the training set (or platform profiles). Thus, the prediction model is finely tuned to the training set. To further improve prediction accuracy when the prediction model is later applied to data sets other than the training set that correlate with the actual CPU utilization, statistically significant metrics from the list of metrics $M_i$ are chosen or selected for actual use by the prediction model. In one embodiment, a stepwise linear regression method is used to determine which set of input metrics are the best predictors for the output variable of the prediction model.

Figure 6:
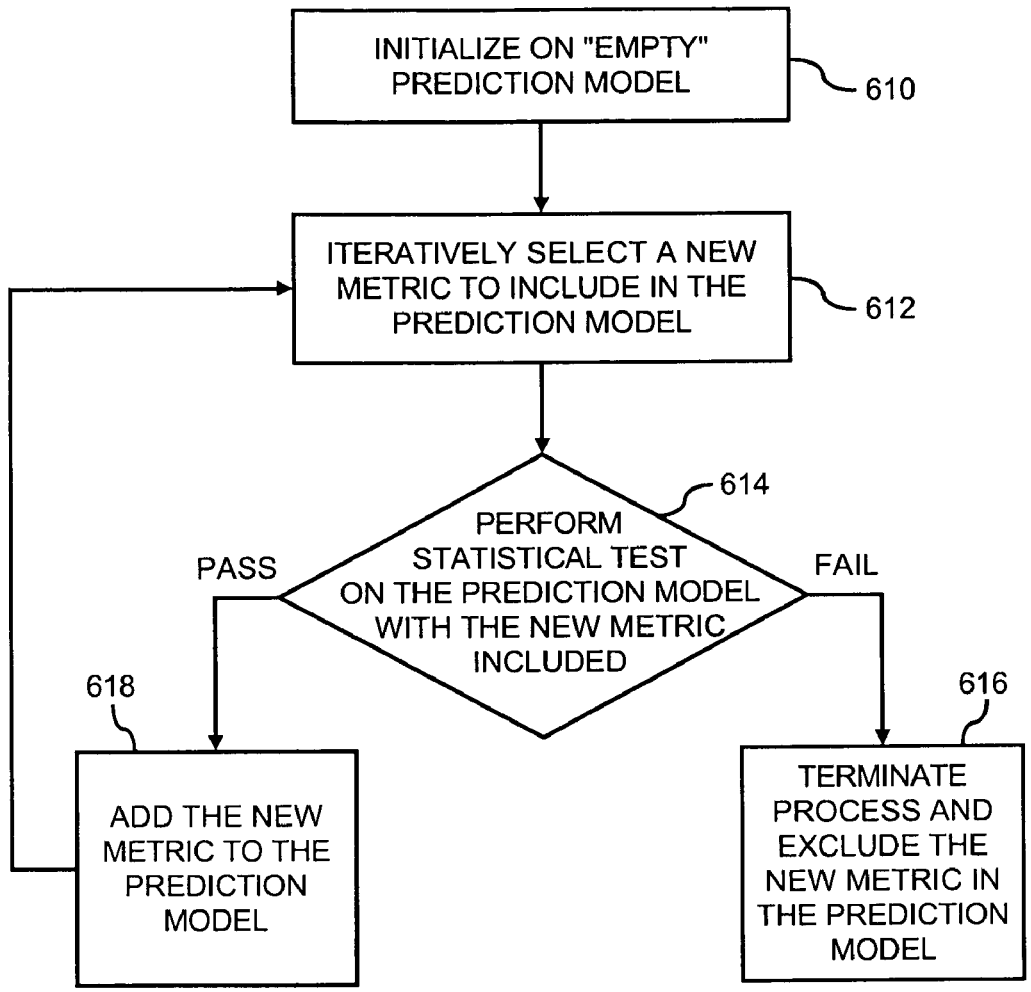
FIG. 6 illustrates another process for predicting resource usage of an application running in a virtual environment platform as it is transferred from its native hardware system, in accordance with one embodiment.

FIG. 6 illustrates a method 600 that uses a stepwise linear regression approach to further improve the prediction model(s) as generated at 420 in FIG. 4. For illustrative purposes only and not to be limiting thereof, FIG. 6 is discussed with reference to the VM model illustrated In FIG. 1B and systems illustrated in FIGS. 3A-B.

At 610, an "empty" prediction model is initialized, wherein the prediction model includes none of the possible performance metrics collected from the native system, such as the eleven performance metrics listed in Table 1.

At 612, a computational iteration is initiated to select a new metric for inclusion in the prediction model. That is, for each metric $M_i$ ($1 \leq i \leq 11$), the following set of equations are formed to calculate CPU utilization of the dom-0 130 based on the monitored particular metric $M_i$:

$$U_{dom0}^1 = c_0 + c_i * M_i^1$$

$$U_{dom0}^2 = c_0 + c_i * M_i^2 \qquad (4)$$

With $c_0^{dom0}$, $c_1^{dom0}$ denoting the approximated solution for the equation set (4) for each particular metric $M_i$, an approximated utilization $\hat{U}_{dom0}^j$ for the same metric is calculated as:

$$\hat{U}_{dom0}^j = c_0^{dom0} + M_i^j \cdot c_i^{dom0} \qquad (5)$$

To solve for $c_0^{dom0}$ and $c_i^{dom0}$ for each particular metric $M_i$, any regression method may be used. For example, the least squares regression method as described earlier may be used to solve the set of equations (4) and (5) so as to minimize the error:

$$e_i = \sqrt{\sum_j \left( \hat{U}_{dom0}^j - U_{dom0}^j \right)_j^2} \qquad (6)$$

which is similar to equation (3) above. Alternatively, a more robust linear regression technique, such as the iteratively reweighted least squares method that uses a bisquare weighting function may be used to lessen the impact of outliers. The best metric $M_i$ is chosen by adding the metric which results in the lowest mean squared error when it is included. That is $M_k$ ($1 \leq k \leq 11$) is selected such that, $$e_k = \min_{1 \leq i \leq 11} e_i \qquad (7)$$

At 614, before the selected metric $M_k$ is added to the prediction model, a determination is made as to whether the inclusion of such a selected metric results in a statistically significant improvement in the accuracy of the prediction model. Thus, in one embodiment, a statistical test, such as an F-test, is performed on the prediction model with the selected metric $M_k$ included therein.

At 616, If the F-test fails, the stepwise regression method 500 is terminated because additional metrics do not provide a significant benefit. Thus, the coefficient $c_k^{dom0}$ corresponding to the selected metric $M_k$ and other metrics $M_i$ that are not to be included in the prediction model are set to zero so as to exclude such metrics from the prediction model.

At 618, however, if the F-test passes, the selected metric $M_k$ is added to the prediction model, and the next iterative is repeated at 512 to choose the next metric from the remaining subset of metrics.

A similar method to the method 600 is applied to generate a prediction model to predict CPU requirements by the VM 120.

Again, the method 600 as illustrated in FIG. 6 is also applicable for generating prediction models for the hypervisor 110 and VM 1200 for a virtual environment that follows the VM model illustrated in FIG. 1A.

As described above, the use of robust and stepwise linear regression techniques helps lessen the impact of occasional outliers or bad data points on the accuracy of the prediction model. However, such techniques may not be as effective if, for example, all measurements in the training data of a benchmark set are corrupt. For example, a set of benchmark measurements may be corrupted because the execution of a benchmark set of the benchmark suite in the native and/or virtual systems were unexpectedly disrupted because of additional background processes, incorrect client configurations, network connection problems, etc. Thus, in one embodiment, to evaluate the quality of benchmark data that is used in the experimental or training data set, an additional analysis is performed to filter out collected benchmark data with high error against the obtained regression-based prediction model. Consequently, a more accurate prediction model may be created from the reduced training data set. Furthermore, benchmark sets in the benchmark suite that are associated with the "failed" benchmark data may be rerun in the native and virtual systems to confirm errors in the failed data and eliminate error-prone manual processes in order to support a fully automated solution.

Accordingly, to increase accuracy of the prediction model, erroneous benchmark tests are detected, and they are either rerun or their data points removed from the training data set. However, at runtime, it may be very difficult to determine whether a benchmark set in the benchmark suite is behaving correctly because resource utilization traces are not available for collection until the benchmark suite has completed its execution in the native and virtual systems. Thus, the benchmark suite may be executed to collect a training set from which an initial prediction model is generated as described with reference to the method 400 in FIG. 4 above (with or without stepwise regression method 600 in FIG. 6). Then, post processing is performed on the training set against the initial prediction model to identify and filter out benchmark data that exhibit anomalous behaviors.

Figure 7:
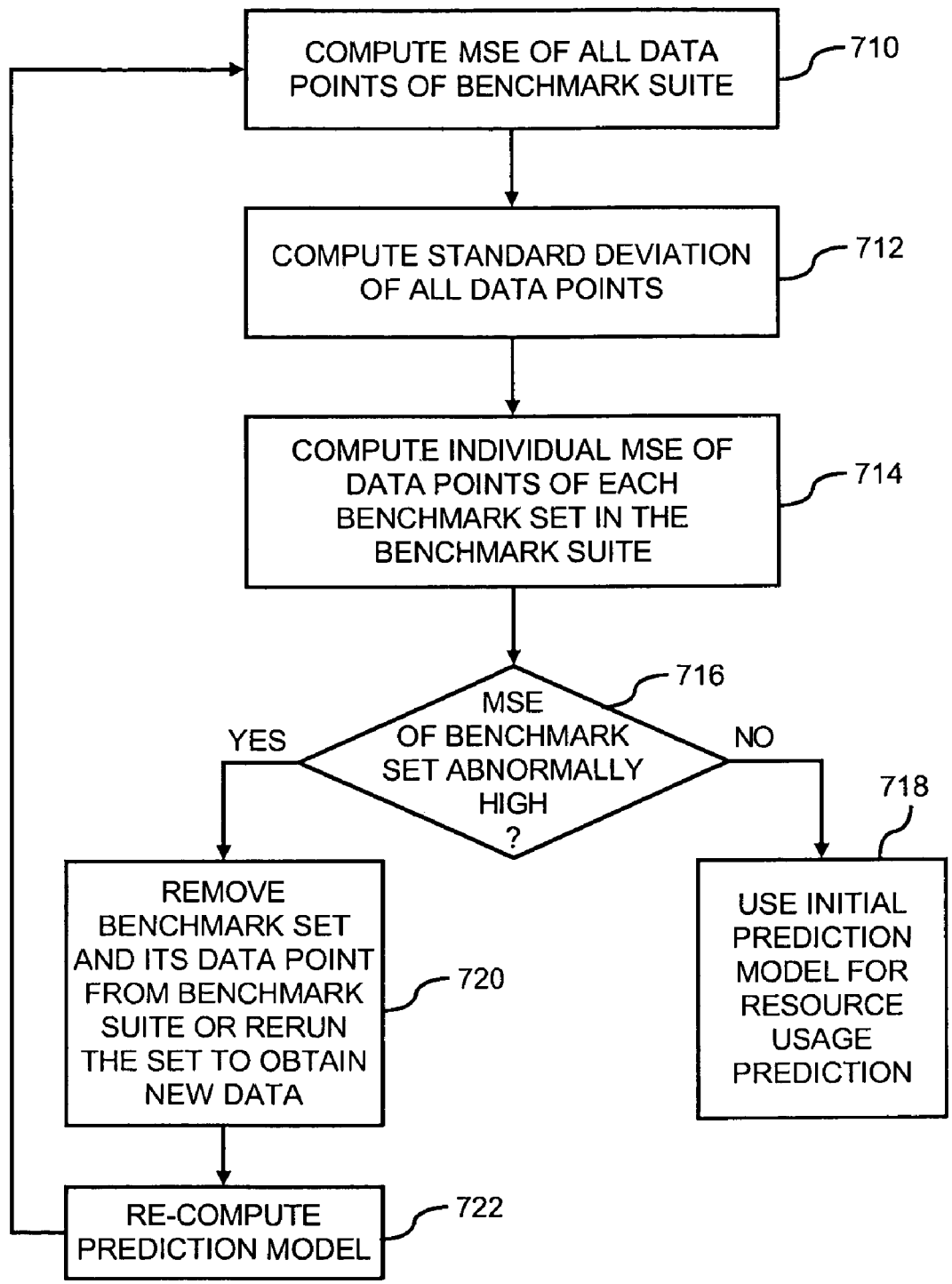
FIG. 7 illustrates a process for benchmark error detection, in accordance with one embodiment.

FIG. 7 illustrates a process or method 700 for benchmark error detection, in accordance with one embodiment. For illustrative purposes only and not to be limiting thereof, FIG. 7 is discussed with reference to the VM model illustrated In FIG. 1B and systems illustrated in FIGS. 3A-B.

At 710, the initial prediction model is applied back to compute a cumulative mean squared error (MSE), $e_{mean}$, for all data points collected from the execution of the benchmark suite. That is, a MSE is a cumulative error computed for benchmark data associated with all benchmark sets in the benchmark suite. The MSE is calculated as shown below:

$$e_{mean} = \frac{1}{n} \sum_{j}^{n} (\hat{U}_{dom0}^{j} - U_{dom0}^{j})_{j}^{2} \quad (8)$$

where $U_{dom0}^{j}$ is a measured CPU utilization for a benchmark set executed in the virtual environment (for example, domain-0 130) with the corresponding time interval j, $\hat{U}_{dom0}^{j}$ is the corresponding approximated CPU utilization that is computed by applying the initial prediction model using equation (1), and n is the total number of data points.

At 712, a standard deviation of the squared errors, $e_{std}$, for all data points is also computed as shown below:

$$e_{std} = \frac{1}{n} \sqrt{\sum_{j}^{n} (\hat{U}_{dom0}^{j} - U_{dom0}^{j})_{j}^{2}} \quad (9)$$

At 714, the initial prediction model is also applied back to individually compute a mean squared error, $e_i$, for each benchmark set (as identified by the benchmark ID shown in Table 2) in the benchmark suite. That is, an individual MSE is computed for benchmark data associated with each benchmark set in the benchmark suite. Again, the MSE is calculated as shown below:

$$e_i = \frac{1}{m} \sum_{j}^{m} (\hat{U}_{dom0}^{j} - U_{dom0}^{j})_{j}^{2} \quad (10)$$

where $U_{dom0}^{j}$ is a measured CPU utilization for a benchmark set executed in the virtual environment (for example, domain-0 130) with the corresponding time interval j, $\hat{U}_{dom0}^{j}$ is the corresponding approximated CPU utilization that is computed by applying the initial prediction model using equation (1), i designates a particular benchmark set or ID, and m is the number of data points for the particular benchmark set i, where $m \leq n$.

At 716, a determination is made as to whether the mean squared error, $e_i$, of each benchmark set is abnormally high. In one embodiment, the error $e_i$ is high when:

$$e_i > e_{mean} + 2 \times e_{std} \quad (11)$$

At 718, if it is determined that the error $e_i$ for each benchmark set is not abnormally high, the benchmark set and its associated benchmark data are retained, and the initial prediction model is used for resource usage prediction.

At 720, however, if it is determined that the error $e_i$ is abnormally high based on equation (9) for a particular benchmark set i, that set and its collected benchmark data are either eliminated from the benchmark suite or rerun to obtain new benchmark data.

At 722, a new prediction model is generated with a rerun of the benchmark set i (or exclusion of such a benchmark set) based on, for example, the method 400 in FIG. 4, and the benchmark error detection method 700 is repeated until no more error $e_i$ is detected.

A similar method to the method 700 is applied for benchmark error detection for the VM 120, with computations for $\hat{U}_{vm}^{j}$ and $U_{vm}^{j}$ and errors based on such values instead of values for $\hat{U}_{dom0}^{j}$ and $U_{dom0}^{j}$.

Again, the process 700 in FIG. 7 also applicable for the VM model illustrated in FIG. 1A, with computations for $\hat{U}_{hyper}^{j}$, $U_{hyper}^{j}$, $\hat{U}_{vm}^{j}$, and $U_{vm}^{j}$ and errors based thereon.

Accordingly, while it is possible for benchmark errors to be manually detected and corrected, the process 700 enables an automation of benchmark error detection so that such error detection may be incorporated into an automated process for generating prediction models for resource usage prediction of applications running in a virtual environment or system. It should be noted that if the benchmark error detection process is too rigorous, it may eliminate too many benchmark data points and reduces the effectiveness of the prediction model.

Figure 8:
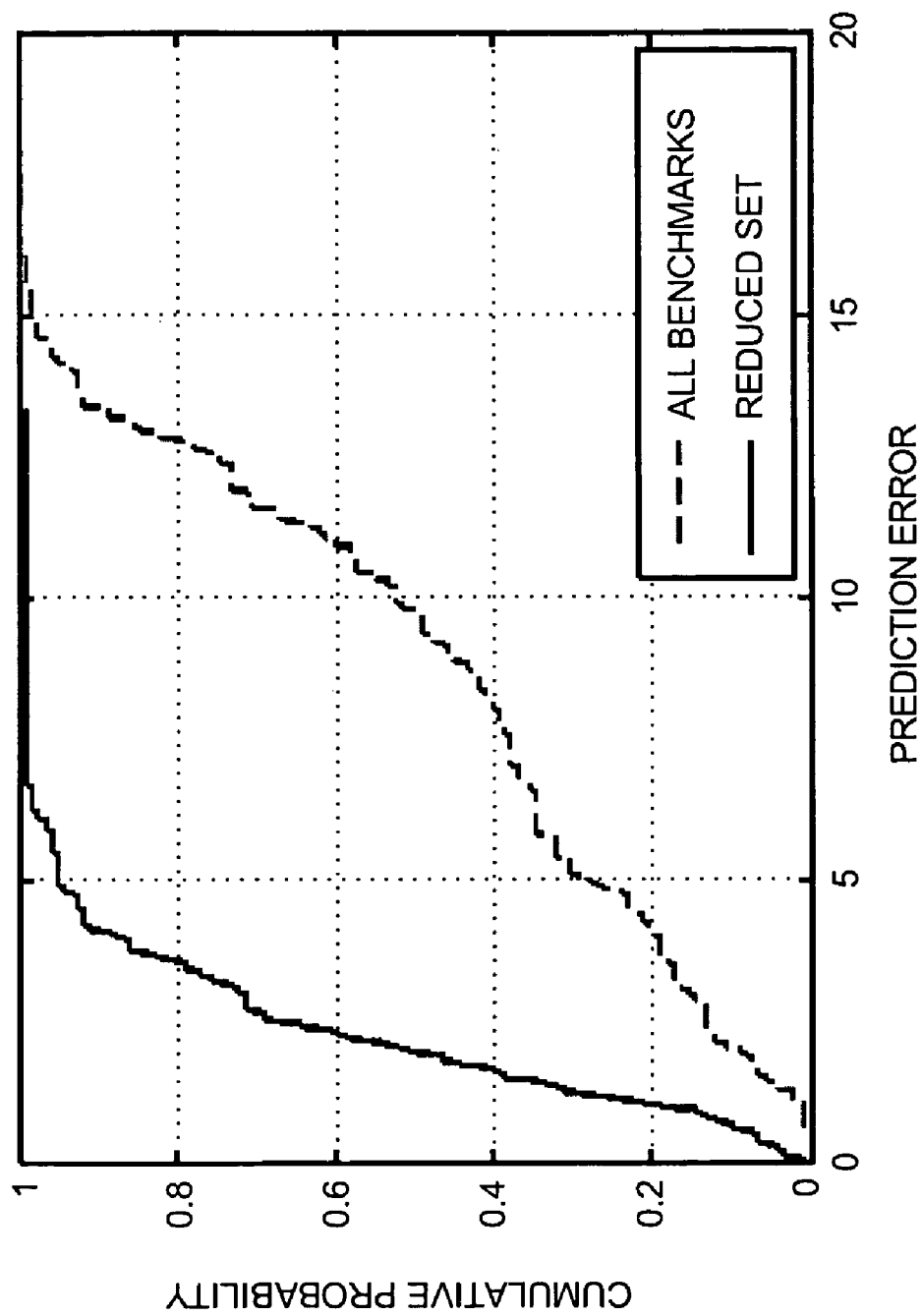
FIG. 8 illustrates the accuracy of benchmark error detection, in accordance with one embodiment.

FIG. 8 illustrates the cumulative distribution of errors as calculated in equations (3) and/or (6) that helps to evaluate the range and percentage of errors. Particular, FIG. 8 illustrates a change in the accuracy of the prediction model after the benchmark error detection process eliminates the malfunctioning (or abnormal) benchmarks, as shown by the solid graph line. That is, for the reduced set of benchmarks, 95% of the errors exhibit less than 5% of error. This graph line is based on a set of training data where 10% of the benchmark data points therein are corrupted, for example, due to additional background processes or incorrect client configurations. FIG. 8 also illustrates the accuracy of the prediction model when failed benchmark data points are not removed from the training set, as shown by the dashed line. That is, only about 30% of the errors exhibit less than 5% of error. It is also found that the model performance before and after the error detection algorithm is identical because very few data points are eliminated. Accordingly, the process 700 is capable of providing benchmark error detection without eliminating too many benchmark data points so as to improve the overall performance of the prediction model.

Figure 9:
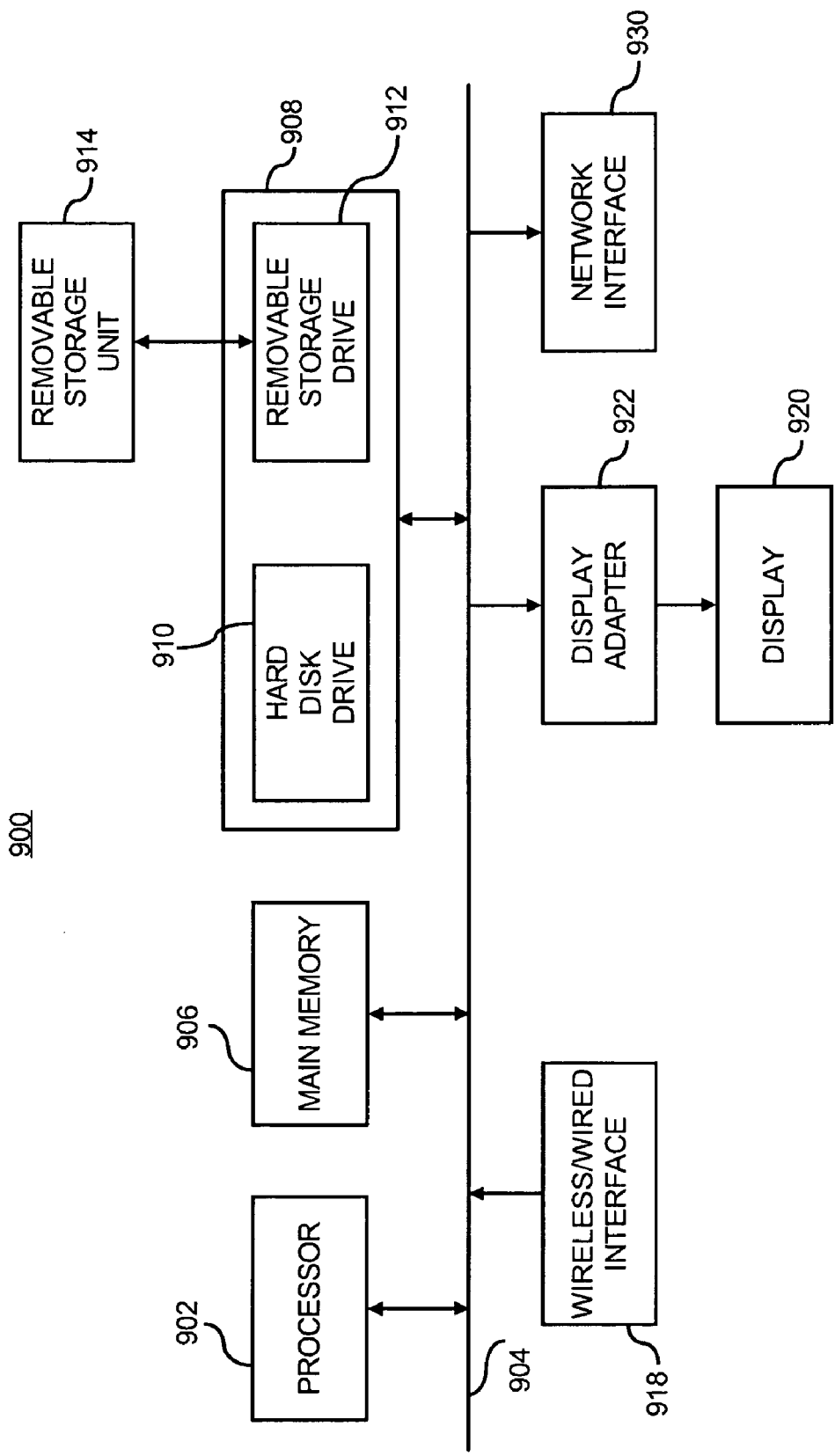
FIG. 9 illustrates a computerized system that may be used as platform to implement a native hardware system, a virtual system, and/or a client system, in accordance with one embodiment.

FIG. 9 illustrates a block diagram of a computerized system 900 that is operable to be used as a platform for implementing a client system that may be used to provide inputs to the test native hardware and virtual systems to generate the prediction model as described earlier. The client system may also serve as the automated benchmark system as noted earlier. Another computerized system 900 may also serve as a native hardware system (such as the hardware system #1 in FIGS. 3A-B) and/or a hardware platform on which a virtual system is implemented (such as the hardware system #2 or #3 in FIGS. 3A-B).

The computer system 900 includes one or more processors, such as processor 902, providing an execution platform for executing software. Thus, the computerized system 900 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 902 are communicated over a communication bus 904 or through point-to-point links with other components in the computer system 900.

The computer system 900 also includes a main memory 906 where software is resident during runtime, and a secondary memory 908. The secondary memory 908 may also be a computer-readable medium (CRM) that may be used to store software programs, applications, or modules that implement the methods or processes in FIGS. 4 and 6, applications running natively, and/or components for a virtual environment (such as a hypervisor, driver domains, and VM guests). The main memory 906 and secondary memory 908 (and an optional removable storage unit 914) each includes, for example, a hard disk drive 910 and/or a removable storage drive 912 representing a floppy diskette drive, a magnetic tape drive, a compact disk drive, etc., or a nonvolatile memory where a copy of the software is stored. In one example, the secondary memory 908 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 900 includes a display 920 connected via a display adapter 922, user interfaces comprising one or more input devices 918, such as a keyboard, a mouse, a stylus, and the like. However, the input devices 918 and the display 920 are optional. A network interface 930 is provided for communicating with other computer systems via a network, such as the Internet or an intranet. For example, if the computerized system 900 is used to implement the client system, the network interface 930 may be used to provide inputs to the test systems via a network and receive resource usage traces from the test systems. If the computerized system 900 is used as a hardware platform for the native hardware or virtual systems, the network interface 930 may be used to communicate with the client system to receive inputs for running the benchmark suite and provide resulting resource usage traces to the client system.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for detecting an error in a prediction of resource usage of an application running in a virtual environment, comprising:
    providing a plurality of benchmark sets;
    executing the plurality of benchmark sets in a native hardware system in which the application natively resides;
    executing the plurality of benchmark sets in the virtual environment;
    collecting first traces of first resource utilization metrics in the native hardware system based on the execution of each of the plurality of benchmark sets in the native hardware system;
    collecting second traces of second resource utilization metrics in the virtual environment based on the execution of each of the plurality of benchmark sets in the virtual environment;
    generating at least one initial prediction model that maps the first traces of first resource utilization metrics to the second traces of second resource utilization metrics;
    computing a plurality of mean squared errors (MSE's) based on the at least one initial prediction model, each of the MSE's is further based on and associated with the collected first and second traces for a different one of the plurality of benchmark sets; and
    determining whether to use the initial prediction model to predict a resource usage of the application running in the virtual environment based on the plurality of MSEs.

2. The method of claim 1, further comprising:
    computing a cumulative MSE based on the at least one initial prediction model and all of the collected first and second traces that are associated with the plurality of benchmark sets.

3. The method of claim 2, wherein determining whether to use the initial prediction model comprises:
    determining whether to use the initial prediction model to predict a resource usage of the application running in the virtual environment based on a comparison of each of the plurality of MSE's to the cumulative MSE of plurality of benchmark sets.

4. The method of claim 2, further comprising:
computing a standard deviation of a squared error for all of the collected first and second traces that are associated with the plurality of benchmark sets, wherein the standard deviation is based on the at least one initial prediction model.

5. The method of claim 4, further comprising:
computing an error sum of the cumulative MSE and twice the standard deviation of the squared error.

6. The method of claim 5, wherein determining whether to use the initial prediction model comprises:
determining whether to use the initial prediction model to predict a resource usage of the application running in the virtual environment based on a comparison of each of the plurality of MSE's to the error sum.

7. The method of claim 6, wherein determining whether to use the initial prediction model further comprises:
upon a determination from the comparison that one of the plurality of MSE's is greater than the error sum, removing the benchmark set associated with the one MSE from the plurality of benchmark sets; and
generating at least another prediction model based on the remaining plurality of benchmark sets
computing another plurality of mean squared errors (MSE's) based on the at least another prediction model; and
determining whether to use the another prediction model to predict a resource usage of the application running in the virtual environment based on the another plurality of MSEs.

8. The method of claim 6, wherein determining whether to use the initial prediction model further comprises:
upon a determination from the comparison that none of the plurality of MSE's is greater than the error sum, using the initial prediction model to predict a resource usage of the application running in the virtual environment based on the plurality of MSEs.

9. The method of claim 1, wherein generating at least one initial prediction model comprises:
generating a first initial prediction model for a driver domain within the virtual environment; and
generating a second initial prediction model for a virtual machine guest within the virtual environment.

10. The method of claim 1, wherein generating at least one initial prediction model comprises:
generating a first initial prediction model for a hypervisor within the virtual environment; and
generating a second initial prediction model for a virtual machine guest within the virtual environment.

11. A system for detecting an error in a prediction of resource usage of an application running in a virtual environment, comprising:
a first hardware platform implementing a native hardware system in which an application natively resides and executes, the native hardware system operating to execute a plurality of benchmark sets;
a second hardware platform implementing a virtual environment therein, the virtual environment operating to execute the plurality of benchmark sets;
a third hardware platform operating to collect first resource usage traces from the first hardware platform that result from the execution of the plurality of benchmark sets in the native hardware system and second resource usage traces from the second hardware platform that result from the execution of the plurality of benchmark sets in the virtual environment;
wherein the third hardware platform further operating to:
generate at least one initial prediction model that maps the first traces of first resource utilization metrics to the second traces of second resource utilization metrics;
compute a plurality of mean squared errors (MSE's) based on the at least one initial prediction model, each of the MSE's is further based on and associated with the collected first and second traces for a different one of the plurality of benchmark sets; and
determine whether to use the initial prediction model to predict a resource usage of the application running in the virtual environment based on the plurality of MSEs.

12. The system of claim 11, wherein each of the plurality of benchmark sets comprises at least two of:
a computation-intensive workload;
a network-intensive workload; and
a disk-intensive workload.

13. The system of claim 12, wherein the plurality of benchmark sets are different from one another by having differential load intensities for at least one of the computation-intensive workload, the network-intensive workload, and the disk-intensive workload.

14. The system of claim 11, wherein the third hardware platform further operating to:
compute a cumulative MSE based on the at least one initial prediction model and all of the collected first and second traces that are associated with the plurality of benchmark sets; and
determine whether to use the initial prediction model to predict a resource usage of the application running in the virtual environment based on a comparison of each of the plurality of MSE's to the cumulative MSE of plurality of benchmark sets.

15. A non-transitory computer readable medium on which is encoded programming code executed by a computer processor to detect an error in a prediction of resource usage of an application running in a virtual environment, the encoded programming code comprising: programming code for providing a plurality of benchmark sets; programming code for executing the plurality of benchmark sets in a native hardware system in which the application natively resides; programming code for executing the plurality of benchmark sets in the virtual environment; programming code for collecting first traces of first resource utilization metrics in the native hardware system based on the execution of each of the plurality of benchmark sets in the native hardware system; programming code for collecting second traces of second resource utilization metrics in the virtual environment based on the execution of each of the plurality of benchmark sets in the virtual environment; programming code for generating at least one initial prediction model that maps the first traces of first resource utilization metrics to the second traces of second resource utilization metrics; programming code for computing a plurality of mean squared errors (MSE's) based on the at least one initial prediction model, each of the MSE's is further based on and associated with the collected first and second traces for a different one of the plurality of benchmark sets; and programming code for determining whether to use the initial prediction model to predict a resource usage of the application running in the virtual environment based on the plurality of MSEs.

* * * * *